No. 616,335. Patented Dec. 20, 1898.
W. H. P. JONES.
PROSPECTING WHEEL.
(Application filed May 24, 1898.)
(No Model.) 4 Sheets—Sheet 1.
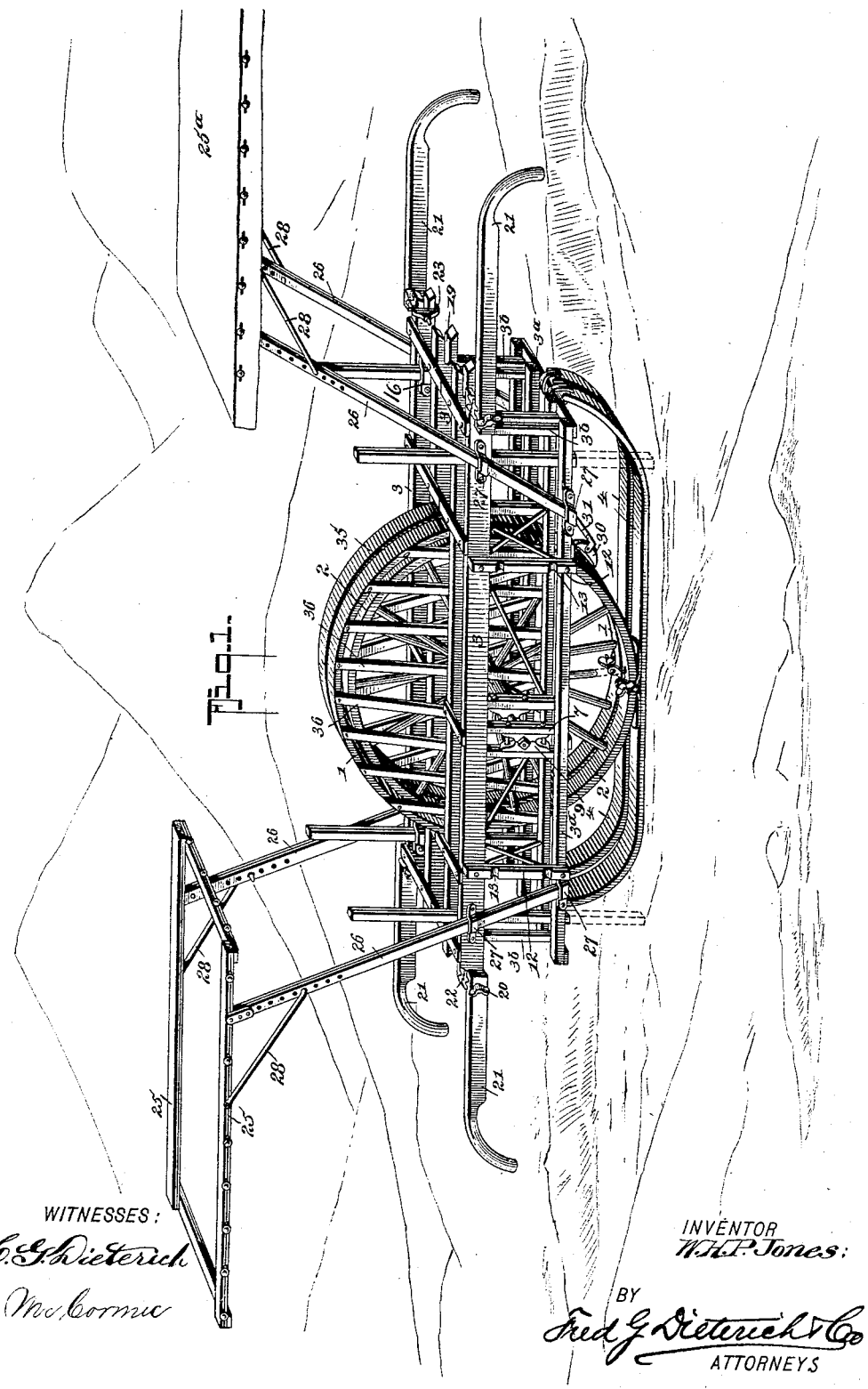
WITNESSES:
H. G. Dieterich
E. McCormic
INVENTOR
W.H.P. Jones:
BY
Fred G. Dieterich & Co
ATTORNEYS No. 616,335. Patented Dec. 20, 1898.
W. H. P. JONES.
PROSPECTING WHEEL.
(Application filed May 24, 1898.)
(No Model.) 4 Sheets—Sheet 2.
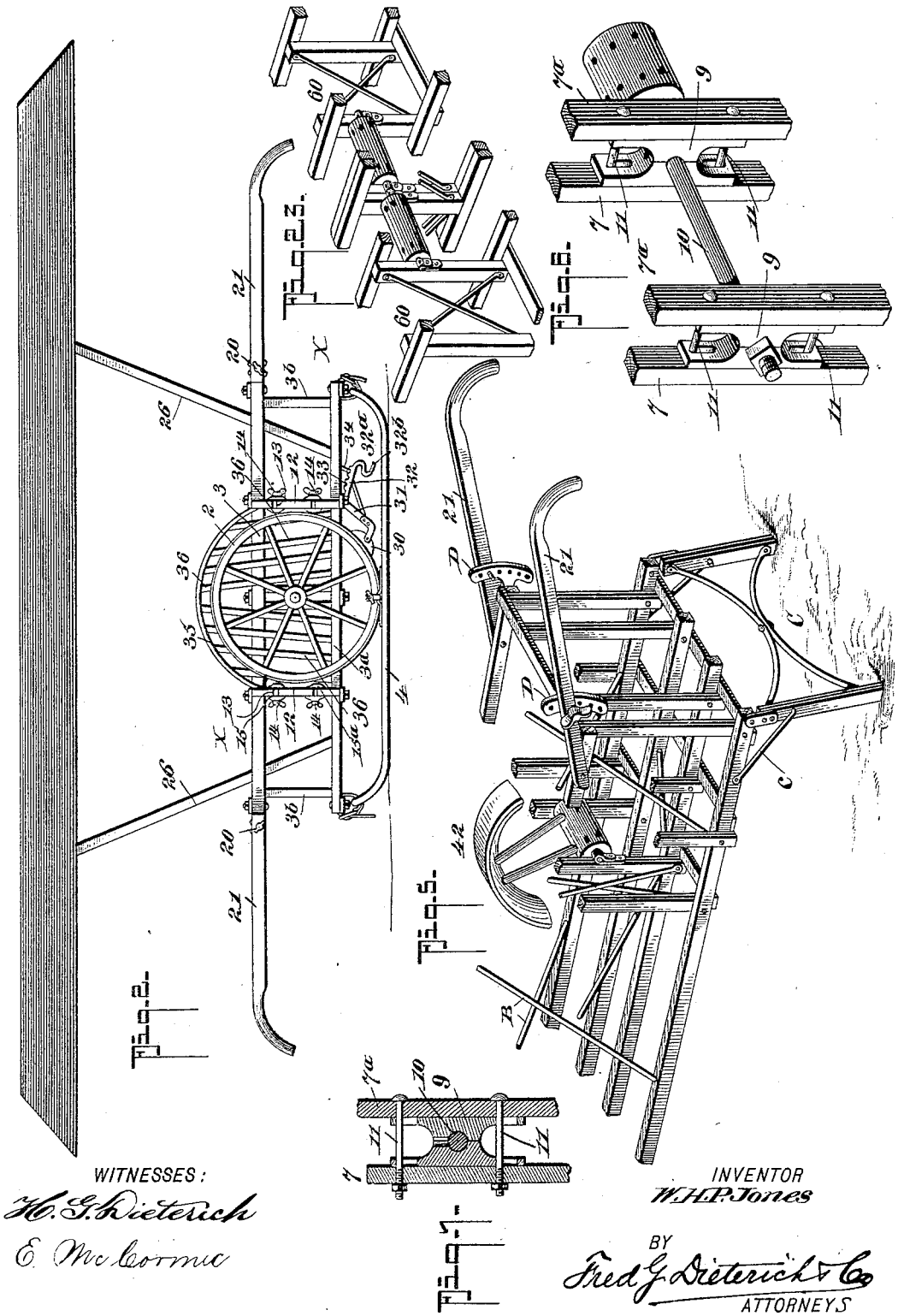

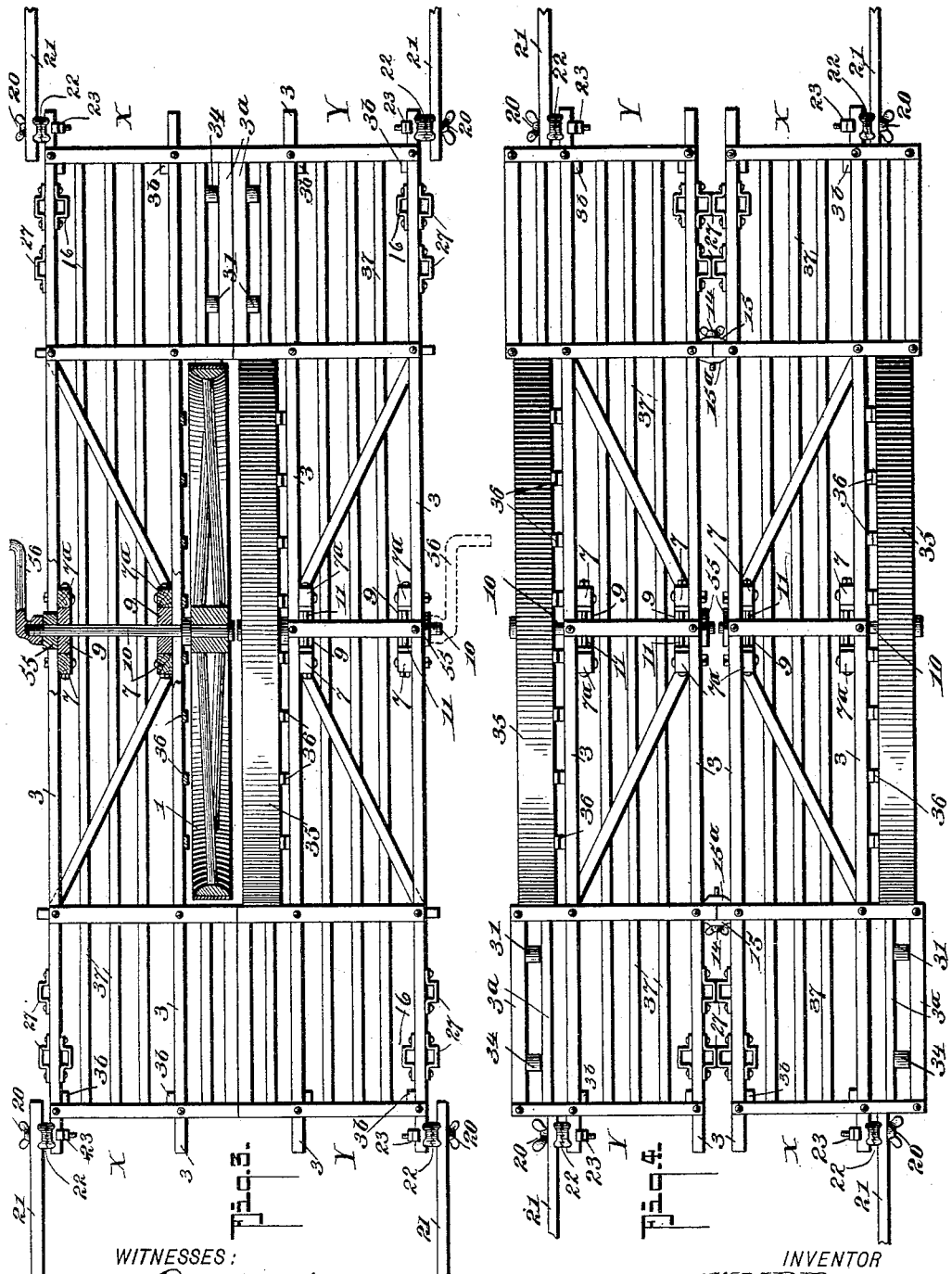

No. 616,335. Patented Dec. 20, 1898.
W. H. P. JONES.
PROSPECTING WHEEL.
(Application filed May 24, 1898.)
(No Model.) 4 Sheets—Sheet 4.
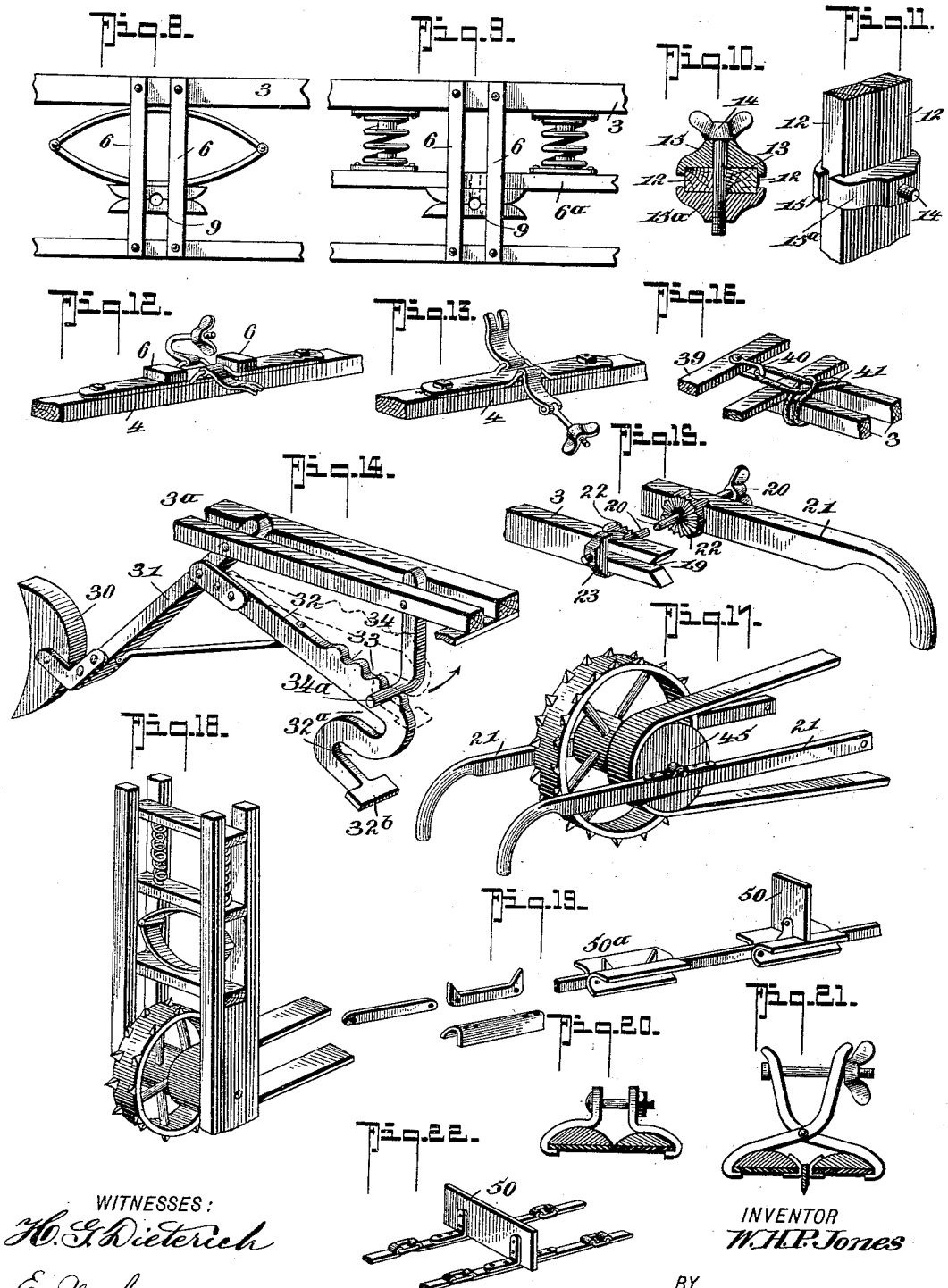
WITNESSES:
H. G. Dieterich
E. McCormic
INVENTOR
W. H. P. Jones
BY
Fred G. Dieterich & Co.
ATTORNEYS

UNITED STATES PATENT OFFICE.

WILLIAM H. P. JONES, OF HIGHLAND, CALIFORNIA.

PROSPECTING-WHEEL.

SPECIFICATION forming part of Letters Patent No. 616,335, dated December 20, 1898.

Application filed May 24, 1898. Serial No. 681,642. (No model.)

*To all whom it may concern:*

Be it known that I, WILLIAM H. P. JONES, residing at Highland, in the county of San Bernardino and State of California, have invented a new and useful Prospecting-Wheel, of which the following is a specification.

My invention, which I have termed a "prospecting-wheel," is an apparatus more especially adapted for miners' uses in prospecting, and has for its object to provide a portable vehicle which can be compactly arranged so as to be made to travel at almost any place that man can travel.

The invention also has for its purpose to provide an apparatus for the purposes stated of a very compact nature in which the several parts are so arranged that the supporting or drive wheel or runner portions can be connected so as to bear a close relation, whereby to permit the apparatus being carried through narrow passes and through such ways and roads where it would be impossible for an ordinary vehicle to pass, and which can also be so adjusted in relation to each other as to provide a vehicle having the drive-wheels or runners so disposed as to form a broad-gage vehicle for convenient travel on the ordinary roadways.

This invention also has for its purpose to provide a carryall or prospecting-wheel having a novel arrangement of sun and rain protector in the nature of an inverted scow, whereby the device can be floated when it is desired to pass over waterways.

The invention comprehends a novel construction of parts whereby the wheels, the runners, the guide-handles, and the draft appliances can be interchangeably and adjustably arranged to suit the conditions and requirements necessary to assemble the several parts to enable the entire structure to be carried over such trails or into such regions where the entrance of ordinary vehicles would be impossible.

In its subordinate features this invention embodies certain novel combinations, details of construction, and peculiar combinations of parts, such as will be first described in detail, and then be specifically pointed out in the appended claims, reference being had to the accompanying drawings, in which—

Figure 1 is a perspective view of my improvement, the sled or runner members being shown attached. Fig. 2 is a side elevation of the same, illustrating the overhead scow attachment. Fig. 3 is a plan view of the apparatus, showing the parts adjusted to their narrow gage. Fig. 4 is a plan view illustrating the parts adjusted to their broad gage. Fig. 5 is a detail view of the modified arrangement of the apparatus. Figs. 6 and 7 are detail views of the wheel-shaft adjustable bearing devices. Figs. 8 and 9 are views of modifications thereof. Figs. 10 and 11 are detail views illustrating some of the clamp devices for securing the meeting beams of the two sections. Figs. 12 and 13 are detail views illustrating different forms of clamp means for securing the sled to the rim of the drive-wheels. Fig. 14 is a detail view of the brake devices used in my apparatus. Fig. 15 is a detail view illustrating the adjustable and detachable means for securing the handles to the main frame. Fig. 16 is a view illustrating one way of attaching the draft-whiffletree to one end of the apparatus. Figs. 17 and 18 are detail views illustrating a supplemental or ice-wheel attachment which may be used in connection with the apparatus shown in Fig. 1. Figs. 19, 20, 21, and 22 are detail views illustrating additional attachments for the apparatus, hereinafter specifically referred to. Fig. 23 is a detail view of a modified construction of the frame, hereinafter referred to.

In the practical construction of my apparatus I provide two frame-sections, which are constructed substantially alike and each of which carries a single traveling or supporting wheel and, when necessary, a runner, and such sections are so constructed and have such relation to each other that they can be turned inward to bring the traveling wheels to face, whereby the same are adapted to pass over very narrow ways, or so arranged that the said wheels will face outward and be upon the outside of the frame proper, whereby the apparatus will be in the nature of a carryall having wheels spaced apart to travel over the ordinary roadways.

Referring to the accompanying drawings by numerals, in which like numerals indicate like parts in all the figures, 1 and 2 indicate the drive or supporting wheels, each of which is detachably connected with a supporting frame-section, which consists of a pair of upper horizontal timbers 3 3 and lower horizontal timbers 3ª 3ª, held in alinement with the upper timbers 3 and joined thereto by the vertical beams 3ᵇ 3ᵇ.

The wheels 1, when the apparatus is adjusted as shown in Fig. 1, work independently, but are closely closed together, so that, in practice, I make a trackway six to twelve inches wide, so that the said wheels can travel through such passes where other carts or sleds cannot go.

4 indicate sled-runners, which form a part of the apparatus, and when conditions are such as to make runners advantageous they are adapted to be clamped to the wheels 1 by suitable clamp devices—such, for instance, as shown in Figs. 12 and 13, the form shown in Fig. 13 being of such a nature that it is only necessary to loosen the thumb-nut and swing the clamp members open to release the runner from the wheel. In Fig. 12 the construction of the clamp is substantially like that in Fig. 13, except that hard-rubber blocks 6 are also employed for the wheels to rest on, so that the runners will have a yielding movement when passing over very rough surfaces.

The runners at the end have suitable strap-and-buckle devices whereby they can be conveniently connected to the frame-sections X and Y and have play when passing over rough ground, boulders, &c.

While I have shown in the drawings the runners as turning up at both ends, it is manifest that they need turn up at one end only, and such runners in practice can be covered with any suitable metallic strip.

Each frame-section X and Y has centrally a duplex bearing of vertical guide-posts 7 7ª, in which, in the preferred construction, is held to slide a bearing-box 9, formed of two sections, as most clearly shown in Figs. 6 and 7, by reference to which it will be seen that the spindle or axle 10 of the drive-wheel is solid with the hub and turns therewith.

In practice the spokes of the wheel can be round or flat and are arranged substantially as shown in the drawings, whereby to make the wheel more compact and give it additional strength.

The slide bearing or boxing 9 (shown in Figs. 6 and 7) has elongated slots, through which the bolts 11 pass and on which the bearing or boxing plates slide up or down to regulate the wheel. Each box or bearing 9 has lubricating-apertures, as shown, and in practice the bearing or boxing is made thinner on the lower side, so as to take up wear when the spindle is loose; or instead of making the axle-bearings as shown in Figs. 6 and 7 they may be in the nature of spring-bearings, as shown in Figs. 8 and 9, by reference to which it will be seen that the bearings 9 are disposed horizontally with the axle-spindle traveling in the way between the vertical timbers 6 6 and secured to a supplemental horizontal timber 6ª, which has buffer-springs between it and the upper horizontal timbers 3; or such boxings 9 may be secured to elliptical springs, as shown in Fig. 8.

It will be noticed by reference to Fig. 11 that the sections X and Y have vertical timbers 12, which are provided with semicircular seats or grooves 13 for the passage of the clamp-bolts 14, which have mounted thereon clamp-blocks 15, having smooth apertures for the passage of the bolt 14, and opposing clamp-blocks 15ª, which have threaded apertures on the threaded end of the said bolt 14, as clearly shown in Fig. 11. By this means it will be observed that on either adjustment of the sections X and Y—that is, with the wheels facing inward or facing away from each other—the two sections can be rigidly clamped together to form, as it were, one complete supporting-frame for the entire apparatus.

To provide for suitably supporting the entire apparatus when at rest, the frame-sections X and Y at suitable points near their ends have clamp-brackets 16, in which are held vertical adjusting legs or braces 17, as clearly shown in Fig. 1. Manifestly by releasing the screw-clamps 15 15ª the two sections will be separated from each other, and by turning them around outside in and again putting the clamps in an operative connection with the timbers 12 and adjusting the handles, presently referred to, the entire apparatus will be arranged as a broad-gage carryall for the better or ordinary roadways.

The upper timbers 3 of each section X and Y are extended at the ends and slotted, as at 19, for the passage of the clamp-bolts 20, which are also passed through the handles 21.

22 indicate spur clamp-disks fitted on the bolt 20 on the coincident or abutting face of the handle and the slotted end 19 of the frame, which are adapted to engage and hold the handle in any vertical adjustment, said operation being effected by tightening the bolt 20, the threaded end of which engages with an immovable end 23. By providing means of the character stated for connecting the handle adjustably to the frame-timbers 3 it is obvious that by loosening the bolt 20 such handles, together with their clamping and adjusting means, can be bodily moved or disconnected from the timbers 3, and thereby admit of draft tongues or shafts in connection with either end of such timbers 3 when the conditions are such as to admit of the use of animal power for conveying the apparatus or machine forward.

In practice when the machine is ready to go the legs are elevated and held out of engagement with the ground.

25 indicates supported sunshade or umbrella frames which are adjustably mounted on the ends of the divergingly-disposed arms 26, detachably held in keepers 27 on the timbers 3 3ª, and to allow for the shade being tilted at different angles to suit the operator the shade-frames have pivotal guide-rods 28, adapted to engage with any one of a series of apertures in the upper ends of the brace-supporting arms 26.

The frames 25 are so constructed that when it is not necessary to use the sunshade or umbrella the canvas covering $25^a$ can be readily removed and the rectangular frame-section folded up in a compact form for transportation.

As it is absolutely essential in an apparatus of this kind to provide the same with a quick and positively acting brake mechanism, I have provided a swinging brake-shoe 30, pivotally hung from the lower timbers $3^a$, which is adapted to swing out of a braking condition by gravity and to be moved in against the wheels 1 by a suitable detent mechanism, which may be of any desired construction; but I prefer to employ the device shown most clearly in Fig. 14, by reference to which it will be seen that the shoe-carrying shank 31 has a rearwardly-extending arm 32 adjustably secured thereto, the rear end of which has an S-slot $32^a$, terminating in a foot-piece $32^b$, while the upper edge has notches 33.

34 indicates a gravity or swinging detent having an outwardly-extending finger $34^a$, which is adapted to be moved into engagement with the notches 33 and lock the same to its brake position. To release the brake, the detent 31 is swung outward in the direction indicated by the arrow, which permits the arm 32 and the brake-shoe to swing backward to the position indicated in dotted lines, in which position they are then held by the detent 34 swinging back with its member $34^a$ in engagement with the S-slot 32, it being manifest that when desired to apply the brake it is only necessary to press down on the foot portion $32^a$, which will cause the arm 32 to become disengaged from the detent 34, which then again falls back in engagement with the serrated upper edge of the arm 32.

35 indicates a bent rim which in practice is sawed in two sections and bolted to form a guard for the wheel and keeps goods from falling between the same, and 36 indicates thin slats secured to the guard and to the inner members 3 of the frame-sections X and Y, which keep the goods from engaging with the spokes of the wheels, such slats being secured to the guard by suitable clenched wire staples. The frame-sections X and Y may also be provided with thin slats 37 on the bottom to keep goods from falling through.

When horse-power is used, I prefer to employ the draft devices such as shown in Fig. 16, in which 39 indicates an evener or whiffletree, 40 the clevis, and 41 the rope-clench for securing the whiffletree to the adjacent inner timbers 3.

In Fig. 5 I have shown a view of a modified form of my invention in which 42 indicates a portion of the single wheel, of suitable width and diameter, and which is adapted for use at such points where it would be practically impossible even where my apparatus shown in Fig. 2, adapted to the narrow gage, could not pass through. In the latter construction in practice the wheel is also provided with a guard-rim and side slats, and the frame is provided with braces B, preferably one-quarter of an inch round iron, and instead of having vertical adjusting-legs, as in the other construction described, the ends of the bottom timbers have secured thereto swinging supports C, held to their supporting position by the brace-rods $c$, it being obvious that in traveling the said supports C are swung up and held against the end of the frame. In this latter construction instead of making the handles as shown in Fig. 1 the frame has segmental irons D having a series of apertures, and the handles are pivotally connected to the frame and provided with bolts adapted to engage the threaded apertures on the said segmental members D.

The spindle on the wheel in the modified form may or may not have vertical adjustment and is also provided with the usual lubricant-apertures, as shown. In practice the framework is built of suitable wood of such character as to render the apparatus light, tough, and of great strength.

So far as described it should be stated that in practical experience I have found that by providing an apparatus having the construction described the same is adapted to run through soft plowed ground, when the wheels are arranged to their narrow gage, with greater ease than can be accomplished by the ordinary carryall where the wheels are of a broad gage and have a very wide tread-face. Furthermore, by arranging the wheels as shown in Fig. 1 one man can carry a very large load over rough and narrow passes.

For the benefit of "Klondikers" or others where in prospecting they must of necessity cross streams the shade or umbrella section of my apparatus may be in the nature of an inverted scow or boat, so that when necessary to cross a stream the apparatus can be inverted and used as a scow.

To facilitate the transportation of my form of apparatus over ice and hard snow, attachable handle members having journaled thereon ice-wheels, as indicated in Fig. 17, the shaft of which is provided with a band-pulley 45, may be connected with the main frame and the pulley 45 belted with the main or drive wheels.

Instead of supporting the ice-wheels in handle members the same may be mounted in the supplemental frame-section, as indicated in Fig. 18, adapted to be secured to the frame-sections X and Y, in which is held an ice-wheel normally pressed in engagement with the ice or snow surfaces by means of its bearing-beams sliding in suitable guideways held spring-pressed downward, as shown.

In Figs. 20, 21, 22, and 23 I have illustrated certain attachments which may be used in connection with my apparatus when the wheels are arranged as shown in Fig. 1, such attachments comprising an endless chain formed of detachable sections having a series of transverse blades 50. The chain 50ª when as shown in Fig. 20 is adapted to clamp between the edges of the two wheels and to pass round the periphery thereof, so as to form practically a single central draft-wheel having suitable spurs or transverse rib-plates whereby to engage the ice or snow and provide for a positive grip of the said wheels as they pass over ice and snow, it being understood that when such attachments are used the two wheels clamp to turn together.

From the foregoing description, taken in connection with the accompanying drawings, it is thought that the complete method of use of my apparatus and its advantages will be readily understood. It will be observed that I have provided a prospecting wheel or apparatus which can be carried or passed into regions and places where it is absolutely impossible for ordinary vehicles to pass into or over. Furthermore, my improved apparatus is of such nature as to be adapted to carry quite a large load of feed or provisions and other necessities which are required when camping out or prospecting in mining regions. Furthermore, by arranging the frame mechanism and providing for the transposing of the two sections X and Y to bring the wheels wide apart it is obvious that a carryall having the ordinary arrangement of draft-wheels is provided.

Numerous changes in details of construction and modifications of the several parts may be made without departing from the scope of the appended claims.

The spindles of the wheels 1 are projected through the outer boxing to receive the securing-nut 55, the ends extending beyond the nut, so as to readily receive the threaded portion of the cranks 56, which can be secured to the spindle for turning the wheel when traveling over ice-surfaces.

In Fig. 23 is shown a somewhat modified construction of the supporting-frame, in which the frame is provided with outer supplemental frame members 60, which serve to support the outer ends of the axles of the drive-wheels, such supplemental frames being provided to equalize the weight on the machine upon both ends of the axle.

Having thus described my invention, what I claim, and desire to secure by Letters Patent, is—

1. An apparatus for the purposes described, comprising a supporting-frame formed of sections; a drive-wheel mounted in each section; a clamping mechanism adapted to interchangeably join the sections, whereby said sections may be adjusted to bring the wheels close together or separated for the purposes specified.

2. An apparatus for the purposes described; comprising a supporting-frame formed of sections; a drive-wheel mounted in each section; clamping mechanism for interchangeably joining the two sections; and a runner for each section adapted to be detachably connected therewith and having clamp devices for engaging the wheels as set forth.

3. An apparatus for the purposes described; comprising a frame formed of two longitudinal sections, each section having a supporting-wheel journaled thereon and having on the opposite sides clamping members, clamp devices for engaging said members and holding the frame with the wheels turned either to their inward or outward positions; and handle members detachably and adjustably secured to the said frame-sections, substantially as shown and for the purposes described.

4. An apparatus for the purposes described; comprising a suitable supporting-frame having drive-wheels; and having detachable vertically-projecting brace members and a rain or sun shield connected to such members and disposed longitudinal of the apparatus, said shield being constructed to form a scow when inverted as set forth.

5. In an apparatus as described, the combination of the main frame; the drive-wheel; the detachable runner; and clamp devices secured to the runner adapted to engage the wheel, said devices having elastic bearing-blocks on which the said wheel is adapted to rest as and for the purposes described.

6. An apparatus for the purposes described; comprising a frame formed of longitudinal sections; a wheel mounted in each section; clamp devices for holding the said sections joined with the wheels in close relation; and a detachable rim having ice spurs or ribs, said rim being common to both wheels and means for holding said rim to such wheels, substantially as shown and described.

7. An apparatus for the purposes described; comprising a frame formed of two longitudinal sections, each having a supporting or drive wheel, clamp devices for interchangeably connecting the said frame-sections, whereby to bring the wheels closely together or separated as specified; handle members adjustably and detachably connected to such frame-sections, and a foot-operated brake mechanism for engaging the wheels having detent devices for holding the brakes to their operative position, substantially as shown and for the purposes described.

8. In an apparatus as described, the combination with the longitudinal frame-sections, said sections having clamp members 12; of clamp devices consisting of a bolt threaded at one end, a clamp-shoe 15, having a smooth aperture for the passage of the said bolt, and a similar clamp 15ª, opposing the clamp 15, having a threaded aperture for the threaded end of the bolt as specified.

9. An apparatus for the purposes described, comprising a frame formed of longitudinal sections, each section comprising longitudinal and vertical timbers detachably connected and having slide-bearings; a combined drive and supporting wheel for each section having its spindle mounted in said bearings, clamp devices for securing the two sections together to form them into one fixed frame-body; handle members detachably and adjustably connected to the frame-sections; runners detachably connected to the frame-sections and having clamps for securing the wheels; foot-operated brake devices on each frame-section; said frame-sections having guards covering the periphery and the outer sides of the wheels, all being arranged substantially as shown and described.

WILLIAM H. P. JONES.

Witnesses:
CHAS. A. JONES,
JAMES F. PIKE.